United States Patent [19]

Dammann

[11] 4,338,239
[45] Jul. 6, 1982

[54] POLYACRYLATE THICKENING AGENTS

[75] Inventor: Laurence G. Dammann, Crestwood, Ky.

[73] Assignee: Celanese Corporation, New York, N.Y.

[21] Appl. No.: 248,164

[22] Filed: Mar. 30, 1981

Related U.S. Application Data

[63] Continuation-in-part of Ser. No. 196,009, Oct. 10, 1980, abandoned.

[51] Int. Cl.³ ................ C08F 220/06; C08L 33/02
[52] U.S. Cl. .................... 524/549; 525/328; 525/329; 526/271; 526/304; 526/317; 560/205; 568/616; 568/662; 524/555; 524/558
[58] Field of Search .......... 260/29.6 H, 29.6 TA, 260/33.4 R, 33.2 R, 32.6 NA, 32.4, 33.8 UA, 31.2 R, 31.2 N; 525/328, 329; 526/271, 304, 317

[56] References Cited

U.S. PATENT DOCUMENTS

| 2,798,053 | 7/1957 | Brown ............................... 260/2.2 |
| 2,883,351 | 4/1959 | Uraneck et al. .................... 260/17.5 |
| 2,956,046 | 10/1960 | Glavis et al. ...................... 260/80.5 |
| 3,035,004 | 5/1962 | Glavis ............................... 260/29.7 |
| 3,426,004 | 2/1969 | Wagner ............................. 260/80.3 |
| 3,436,378 | 4/1969 | Azerlosa et al. .................. 260/78.5 |
| 3,817,949 | 6/1974 | Ribba ............................... 260/30.3 E |
| 3,878,151 | 4/1975 | Dachs et al. ..................... 260/29.6 T |
| 3,894,980 | 7/1975 | DeTommaso ............... 260/29.6 RW |
| 3,907,730 | 9/1975 | Jones ............................. 260/17.4 SG |
| 3,915,921 | 10/1975 | Schlatzer ....................... 260/17.4 SG |
| 3,978,016 | 8/1976 | Perronin et al. .............. 260/29.6 TA |
| 4,138,381 | 2/1979 | Chang et al. ................. 260/29.6 TA |
| 4,167,502 | 9/1979 | Lewis et al. ................... 260/29.6 H |

*Primary Examiner*—Stanford M. Levin
*Attorney, Agent, or Firm*—Herbert P. Price; T. J. Morgan

[57] ABSTRACT

This invention provides a novel polyacrylate thickening agent which is composed of monomers comprising (1) (meth)acrylic acid, (2) glyceryl allyl ether derivative, and optionally (3) one or more other polymerizable monomers.

In another embodiment, this invention provides a print paste containing the defined novel polyacrylate thickening agent.

17 Claims, No Drawings

POLYACRYLATE THICKENING AGENTS

CROSS-REFERENCE TO RELATED APPLICATIONS

This application is a continuation-in-part of application, Ser. No. 196,009, filed Oct. 10, 1980, now abandoned.

BACKGROUND OF INVENTION

Many types of natural and synthetic polymeric materials are incorporated in aqueous systems for the purpose of providing a thickening or gelling effect.

Illustrative of such thickening agents are natural gums and resins such as starch, gum arabic, modified starch products, dextrins, sodium alginates, tragacanths, and the like. Synthetic materials employed as thickening agents include carboxymethylcellulose, polyvinyl alcohol, polyacrylamide, polyacrylic acids and salts thereof, methylcellulose, carboxymethylcellulose, hydroxyethylcellulose, polyvinylpyrrolidone, polyvinylmethylether, polyethyleneoxides, and copolymers of polyvinylmethylether and maleic anhydride. Thickeners of the polyelectrolyte type include synthetic polymeric water-soluble polymers such as the sodium polyacrylates as well as the copolymers of various acrylates, such as are described in U.S. Pat. Nos. 2,798,053; 2,883,351; 2,956,046; 3,035,004; 3,436,378; 3,915,921 and 4,167,502.

Water-soluble polyelectrolyte copolymers employed as thickeners include those esters prepared by the esterification reaction between the acid anhydride groups of a copolymer of an alkylvinylether and maleic anhydride with the terminal hydroxyl groups of a nonionic surfactant of an alkylphenoxyethoxyethanol polymer. The resulting water-soluble polymer is a partial ester which contains free acid groups suitable for subsequent neutralization with a basic material, such as an amine or a metal oxide or hydroxide.

Other thickening agents are carboxylic acid polymers made by copolymerizing acrylic acid with a small amount of a polyallyl polyether of a polyhydric alcohol, e.g., polyallyl sucrose. Such polymers are insoluble in water. The alkali metal salts of which swell in water to form gel like compositions.

Print pastes always contain a thickening agent (besides dyes, binders and other auxiliaries) which provides them with the required degree of viscosity. The thickening agent should be compatible with the conventional components of a textile print paste and should not impair either the dye yield or the fastness of the print. In the case of prints which have been prepared with print pastes containing conventional thickeners, they are often sensitive to squeezing so that a lower dye yield is obtained.

Also, some polyacrylic acid thickening agents of the prior art have generally been associated with the production of harsh hands when they have been used for thickening of impregnating materials for textiles, such as pigment-printing and dyeing compositions. They are also characterized by difficulty in formulation and impairment of water-resistance of the textile or other article treated with compositions containing the known thickeners of this type.

Improved results have been obtained by the development of aqueous emulsions of copolymers of acrylic (or methacrylic) esters with acrylic (or methacrylic) acid more or less reticulated. These emulsions dissolve well in water at a nearly neutral pH value (pH 6–7) to yield appreciable viscosities. These improved products are advantageous due to the possibility of thickening in situ from a fluid emulsion containing 25–40 percent of polymeric solids. However, it is not practical to obtain the polymeric solids in the form of a dry powder, so that they must be stored and handled as aqueous dispersions or solutions. In addition, the thickening agents made by these processes are not as efficient as other prior art thickening agents and require excessive amounts to obtain good results.

Further, thickening agents which contain 10–40 percent acrylic acid or methacrylic acid do not permit the coloristic effect of pigmentary printing pastes to be sufficiently emphasized. In order to avoid obtaining prints which are too dull, the least concentration of thickening agent is employed. In this case, a poor retention of the aqueous phase occurs, which leads to spreading or running effects, and results in prints with diffused outlines.

U.S. Pat. Nos. 3,426,004; 3,817,949; 3,878,151; 3,894,980; 3,978,016; and 4,138,381 are representative of more recent developments which have endeavored to overcome one or more of the disadvantages associated with the manufacture and use of polyacrylic acid type of thickening agents.

Accordingly, it is an object of this invention to provide a novel polyacrylate interpolymer which is adapted for use as an improved type of thickening agent.

It is another object of this invention to provide a high viscosity liquid composition which is adapted to perform as an improved printing paste medium.

Other objects and advantages of the present invention shall become apparent from the accompanying description and examples.

DESCRIPTION OF THE INVENTION

One or more objects of the present invention are accomplished by the provision of an interpolymer of monomers comprising (1) at least 60 weight percent of acrylic acid or methacrylic acid; (2) between about 0.2–20 weight percent of a glyceryl ether derivative in which one hydroxy group is in the free form, one hydroxyl group in in the form of an allyl ether substituent, and the other hydroxyl group is in the form of an ether or ester substituent; and (3) between about 0–20 weight percent of another olefinically unsaturated monomer copolymerizable therewith.

The interpolymer normally has a molecular weight in the range between about 10,000–1,000,000. A typical interpolymer will have a molecular weight in the range between about 20,000–200,000. The molecular weight can be determined by any method well known in the art and can be expressed as number average or as weight average molecular weight.

While less desirable for reasons of economy, the (meth) acrylic acid component can be at least partially replaced by other acrylic acid type monomers such as ethacrylic acid, α-chloroacrylic acid, α-phenylacrylic acid, α-cyanoacrylic acid, itaconic acid, crotonic acid and the like.

With respect to the glyceryl ether derivative monomer component of the interpolymer, this monomer is prepared by reacting allyl glycidyl ether with a monohydric alcohol or a monocarboxylic acid in the mole ratio of allyl glycidyl ether to alcohol or acid of about 1:1 to about 1:0.5. The monohydric alcohols are: alkyl alcohols which contain from one to 20 carbon atoms; arylalkyl alcohols which contain from 7 to 20 carbon atoms; alkenyl alcohols which contain from 12 to 20 carbon atoms; and glycol and polyglycol monoethers having the formula:

$$RO(C_2H_4O)_nH$$

wherein R is an alkyl group which contains from 1 to 10 carbon atoms or an aryl group which is phenyl or alkyl substituted phenyl group wherein the alkyl group contains from 1 to 12 carbon atoms and wherein n has a value of 1 to about 40. The monocarboxylic acids are alkyl monocarboxylic acids which contain from 2 to 20 carbon atoms; arylmonocarboxylic acids which contain 7 to 20 carbon atoms; or alkenyl monocarboxylic acids which contain from 5 to 20 carbon atoms.

The glyceryl ether derivative monomer component of the interpolymer before polymerization can be represented by the formula:

$$CH_2=CH-CH_2OCH_2-\underset{\underset{OH}{|}}{CH}-CH_2-Y$$

wherein Y is an ether or ester group which results from the reaction of allyl glycidyl ether with the alcohols or acids described hereinbefore. The glyceryl ether derivative monomer has a molecular weight which ranges up to about 2000 as calculated from the molecular weights of the reactants.

The glyceryl ether monomer is prepared by the reaction of allyl glycidyl ether with an appropriate alcohol at a moderate temperature (e.g., 70° C.) in the presence of a Lewis acid catalyst (e.g., boron trifluoride etherate):

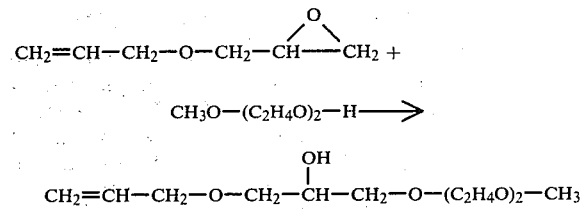

$$CH_3O-(C_2H_4O)_2-H \longrightarrow$$

$$CH_2=CH-CH_2-O-CH_2-\underset{\underset{OH}{|}}{CH}-CH_2-O-(C_2H_4O)_2-CH_3$$

The allyl glycidyl ether and the appropriate monohydric alcohol are reacted in the mole ratio of allyl glycidyl ether to alcohol of 1:1 to 1:0.5 and, preferably, 1:0.95 to 1:0.8.

Examples of appropriate alcohols are alkanols and arylalkanols which contain from 1 to about 20 carbon atoms, such as methanol, isopropanol, butanol, 2-ethylhexanol, cetyl alcohol, lauryl alcohol, stearyl alcohol, cyclohexanol, benzyl alcohol, and the like. Additional alcohols are the alcohols which contain ethylenic unsaturation, such as olelyl alcohol, linolelyl alcohol, palmitolelyl alcohol and the like, i.e., such unsaturated alcohols which contain 12 to about 20 carbon atoms per molecule. Other alcohols are the glycol and polyglycol monoethers, i.e., alcohols which can be represented as follows:

$$RO(C_2H_4O)_nH$$

wherein R is an alkyl group which contains from 1 to about 10 carbon atoms or an aryl group with or without alkyl substitution, and wherein n has a value of 1 to about 40. Examples of such alcohols are the monomethyl ether of ethylene glycol, the monobutyl ether of ethylene glycol, the mono-2-ethylhexyl ether of ethylene glycol, the monomethyl ether of diethylene glycol, the monomethyl ether of polyethylene glycol having a molecular weight of about 350, the monophenyl ether of polyethylene glycol having a molecular weight of about 800, the nonylphenyl ether of polyethylene glycol having a molecular weight of about 1100, and the like. Additional alcohols are those based on propylene oxide rather than ethylene oxide and on block copolymers of ethylene oxide and propylene oxide.

When the glyceryl ether monomer derivative contains an ester group, it is prepared by reacting allyl glycidyl ether with an appropriate monocarboxylic acid at a moderate temperature (e.g., 70° C.) up to the boiling point of allyl glycidyl ether (154° C.) but preferably at about 80° to about 100° C. in the presence of a basic catalyst, a tertiary amine, tertiary amine salt, quaternary ammonium salt or a metal complex catalyst:

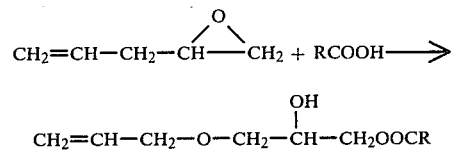

$$CH_2=CH-CH_2-O-CH_2-\underset{\underset{OH}{|}}{CH}-CH_2OOCR$$

The allyl glycidyl ether and the appropriate monocarboxylic acid are reacted in the mole ratio of allyl glycidyl ether to acid of 1:1 to about 1:0.8 and preferably 1:0.95 to 1:0.85.

Useful monocarboxylic acids are alkyl or aryl monocarboxylic acids which contain 2 to 20 carbon atoms or alkenyl monocarboxylic acids which contain 5 to 20 carbon atoms. Examples of such acids are acetic acid, butyric acid, hexanoic acid, pelargonic acid, capric acid, lauric acid, palmitic acid, arachidic acid, benzoic acid, naphthoic acid, oleic acid, linoleic acid, ricinoleic acid, undecylenic acid and the like.

In addition to the (meth)acrylic acid and glyceryl ether monomer components, the interpolymer can contain up to about 20 weight percent of one or more other monomers which are copolymerizable with the said (meth)acrylic acid and glyceryl ether monomer components. Suitable monomers include acrylamide, methacrylamide, N-ethylacrylamide, N,N-dimethylacrylamide, styrene, acrylonitrile, methacrylonitrile, methyl acrylate, ethyl acrylate, propyl acrylate, butyl acrylate, hexyl acrylate, octyl acrylate, methyl methacrylate, vinyl acetate, vinyl propionate, vinyl butyrate, dimethyl maleate, diethyl maleate, dimethyl fumarate, diethyl fumarate, monomethyl maleate, monoethyl fumarate, maleic anhydride, and the like.

In a manner similar to that described in U.S. Pat. No. 3,426,004, the preferred method of preparing the above defined interpolymer is by the polymerization of the mixture of the constituent monomers in an inert organic diluent having some solublizing action on one or more of the monomeric ingredients but substantially none on the resultant interpolymer. Polymerization in an aqueous medium containing a water-soluble free-radical catalyst is an operative method but is less desirable than polymerization in the organic inert diluent. In aqueous polymerizations, the product is recovered as a highly swollen gel, which may be used directly or further dried and subdivided.

Polymerization in an organic liquid diluent in the presence of a solvent-soluble, free-radical catalyst, such as benzoyl peroxide, or azobisisobutyronitrile, is more preferred because the product is usually obtained as a fine precipitate which after solvent removal seldom requires grinding or other further treatment before use. Suitable diluents include benzene, toluene, xylene, ethylbenzene, tetralin, hexane, heptane, octane, carbon tetrachloride, ethylene dichloride, bromotrichloromethane, chlorobenzene, acetone, methyl ethyl ketone, and the like.

The polymerization in the diluent medium may be carried out in the presence of a free-radical catalyst in a closed vessel containing an inert atmosphere and under autogenous pressure or artificially-induced pressure, or in an open vessel under reflux at atmospheric pressure. The temperature of the polymerization may be varied from about 0° C. to 100° C. or higher, more preferably from 20° C. to 90° C., the temperature depending to a large degree upon the activity of the monomers and catalyst used and the molecular weight desired in the polymeric product.

The molecular weights of the product interpolymers are greater for those made in the lower temperature range than for those made in the higher temperature range. Polymerization at 50° C. to 90° C. under atmospheric pressure employing a free-radical catalyst generally provides a polymer yield of 90 to about 100 percent of theory in less than 20 hours, usually in less than 5 hours.

Suitable free-radical catalysts include peroxides such as sodium, potassium and ammonium persulfates, caprylyl peroxide, benzoyl peroxide, pelargonyl peroxide, hydrogen peroxide, cumene hydroperoxide, tertiary butyl diperphthalate, tertiary butyl perbenzoate, sodium peracetate, sodium percarbonate, azobisisobutyronitrile, and the like. Other useful catalysts are the so-called "redox" type of catalyst and the heavy-metal activated catalyst systems. Generally, between about 0.01–2.5 percent by weight or more of catalyst based on monomer weight is sufficient in the invention process.

In another of its embodiments, this invention provides a thickened liquid composition which contains an effective quantity of a thickening agent which as described above is an interpolymer of monomers comprising (1) at least 60 weight percent of acrylic acid or methacrylic acid; (2) between about 0.2–20 weight percent of a glyceryl ether derivative in which one hydroxyl group is in the free form, one hydroxyl group is in the form of an allyl ether substituent, and the other hydroxyl group is in the form of an ether or ester substituent; and (3) between about 0–20 weight percent of another olefinically unsaturated monomer copolymerizable therewith.

The quantity of thickening agent in the liquid composition will average in the range between about 0.1–5 weight percent, based on the weight of liquid medium.

The liquid medium usually is a polar solvent which is capable of dissolving or partially dissolving or at least is capable of being thickened by the thickening agent. Illustrative of suitable solvents and miscible mixtures thereof are esters such as ethyl, butyl, amyl, ethoxyethyl and methoxyethyl acetates, lactates, and propionates; ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohol, and cyclohexanol; ethers such as diethyl ether, monoethyl ether of ethylene glycol, monomethyl ether of ethylene glycol, and monobutyl ether of ethylene glycol; and miscellaneous solvents including dimethylformamide, dimethylacetamide, acetonitrile, nitromethane, nitroethane, nitropropane and nitrobutane, chlorinated hydrocarbons, water; and the like.

The maximum viscosity is attained when the carboxylic acid groups in the interpolymer are at least partially neutralized to a neutral or alkaline pH. In aqueous systems, the neutralization preferably is accomplished with basic agents such as sodium, potassium and ammonium hydroxides, carbonates and bicarbonates. An aqueous medium containing between about 0.1–5 weight percent of interpolymer and having a pH between about 5–9, will generally exhibit a viscosity between about 20,000–60,000 cps at 25° C. (Brookfield, spindle No. 6, 20 rpm).

In non-aqueous systems (e.g., methanol), the interpolymer can be neutralized with organic bases such as primary, secondary and tertiary amines. Typical amines include monoethanolamine, dimethylamine, triethylamine, triethanolamine, and the like.

The above-described thickened liquid composition is uniquely adapted for the formulation of print pastes which exhibit high dye yield and print brilliance, low sensitivity to squeezing by printing machine rollers, and stability to coagulation of binder emulsions when pigments are added.

The invention thickened liquid composition is compatible with dye components such as vat dyes, direct dyes, disperse dyes, reactive dyes and metal complex dyes. The thickened liquid composition can also be combined with pigment dyes in the presence of binders. Illustrative of binders are polymers of esters of acrylic or methacrylic acid and aliphatic alcohols with 1 to 4 carbon atoms with such comonomers as styrene, butadiene, vinylchloride, acrylonitrile, acrylamide, N-methylolacrylamide and 1,4-butanediol mono- and diacrylate. Such polymers may be applied in combination with aminoplast precondensates, e.g., urea or its cyclic or acrylic derivatives, or melamine and formaldehyde.

A print paste prepared in accordance with the present invention exhibits one or more of the following advantages in comparison with print pastes containing a conventional thickening agent:

(1) the dye yield and brilliance of prints are improved;
(2) the prints are less sensitive to squeezing by the printing machine rollers;
(3) the present invention thickening agent in the print paste performs as an emulsifier so that pigment print pastes which contain a pigment binder can be used on textile printing machines; and
(4) the present invention thickening agents set acid fixing dyes.

A print paste can be prepared in the manner described in U.S. Pat. No. 3,878,151 by blending together the thickening agent, water, dye, and optionally a mineral spirit. When employing pigment dyes, a film-forming aqueous copolymer dispersion is added to the print paste.

In addition to print pastes, a present invention interpolymer can be employed as a thickening or bodying agent, for example, in cosmetics, shampoos, toothpastes, ointments, detergents, polymer emulsions (e.g., latex paints), oil well drilling compositions, and the like.

The following examples are further illustrative of the present invention. The reactants and other specific ingredients are presented as being typical, and various modifications can be devised in view of the foregoing disclosures within the scope of the invention. Parts and percentages where used are parts and percentages by weight.

EXAMPLE A

Preparation of 1:0.95 Molar Allyl Glycidyl Ether-Benzyl Alcohol Adduct

To 102.6 grams (0.95 mole) benzyl alcohol in a 500 milliliter three-neck flask is added 0.54 gram (0.48 milliliter) of boron trifluoride etherate, and the solution is heated to 70° C.

Allyl glycidyl ether (114 grams, 1 mole) is then added dropwise over a period of one hour at 70° C. The exothermic heat of reaction is controlled by intermittent cooling. The reaction is completed by maintaining the reaction medium at 70° C. for two hours.

EXAMPLE B

Preparation of 1:0.9 Molar Allyl Glycidyl Ether-Undecylenic Acid Adduct

To a suitable flask are added 165 grams of undecylenic acid, 29 grams of toluene and 2 grams of AMC-2 catalyst (Cordova Chemical Company oil soluble chromium complex). Heat is applied to the flask and when the temperature reaches 90° C., 114 grams of allyl glycidyl ether are added over a 30 minute period while holding the temperature at 90° C. At the completion of the addition, the temperature is held at 90° C. for 3 hours and 45 minutes, at which time the acid value is 0 indicating complete reaction.

EXAMPLE I

Preparation of 95/5 W/W Copolymer of Acrylic Acid/Allyl Glycidyl Ether-Benzyl Alcohol (1:0.95)

A one-liter three-neck flask equipped with stirrer, add funnel, thermometer and condenser is charged with 300 grams of toluene. The toluene is heated to 80° C. with stirring under a sweep of nitrogen.

A solution of 95 grams of acrylic acid, 5 grams of allyl glycidyl ether-benzyl alcohol adduct (1:0.95 molar) and 0.05 gram of azobisisobutyronitrile (AIBN) is added to the flask over a period of two hours, while maintaining the exothermic reaction medium at 80° C. The mixture is held at 80° C. for two or more hours, and then 20 milligrams of AIBN (in acetone) are added. After an additional hour at 90° C., the reaction product mixture is cooled and filtered.

The precipitated solid polymer is recovered, washed with toluene, and dried overnight in a forced air oven at 125° F. The yield of dry polymer is 96.6 grams.

A 0.5 weight percent solution of the polymer in deionized water is produced by neutralizing the aqueous medium with 10 percent sodium hydroxide. The solution exhibits a Brookfield viscosity of 38,500 cps (Spindle No. 6, 20 rpm).

EXAMPLE II

In the same manner as described in Example I, the following interpolymers are prepared:

| Monomer Mole Ratio | Monomers | AGE[1] Reactant Mole Ratio |
|---|---|---|
| 90/5/5 | AA[2]/N,N-dimethylacrylamide/ AGE-butyl Carbitol[3] | 1/0.95 |

-continued

| Monomer Mole Ratio | Monomers | AGE[1] Reactant Mole Ratio |
|---|---|---|
| 93/7 | AA/AGE-cetyl alcohol | 1/0.9 |
| 85/15 | AA/AGE-Igepal CO-800[4] | 1/0.9 |
| 96/4 | AA/AGE-oleyl alcohol | 1/0.9 |
| 94/6 | AA/AGE-butyl carbitol | 1/0.95 |
| 98/2 | AA/AGE-undecylenic acid | 1/0.95 |
| 85/15 | AA/AGE-Igepal CO-850[5] | 1/0.9 |
| 94/6 | AA/AGE-methoxy Carbowax 350[6] | 1/0.9 |
| 95/5 | AA/AGE-isodecyl alcohol | 1/0.9 |

Highly viscous solution of these polymers are formed in water using the procedure described in Example I.
[1]Allyl glycidyl ether.
[2]Acrylic acid.
[3]Monobutyl ether of diethylene glycol (Union Carbide).
[4]Ethoxylated nonylphenol; Avg. M.W. 1540 (G.A.F.).
[5]Ethoxylated nonylphenol: Avg. M.W. 1100 (G.A.F.).
[6]Monomethyl ether of polyethyleneglycol; M.W. 350 (Union Carbide).

EXAMPLE III

Using the procedure described in Example I, glyceryl ether derivatives of allyl glycidylether and Igepal CO-710 (ethoxylated nonyl phenol having an average molecular weight of 682) are prepared wherein the mole ratio of allyl glycidyl ether to Igepal CO-710 is varied from 1:1.04 to 1:0.5.

Copolymers of 15 parts of the allyl derivative monomers and 85 parts of acrylic acid are made using the same procedure as described in Example I. Aqueous solutions of the copolymers are prepared and the viscosities are measured as described in Example I.

The mole ratios of reactants used to make the allyl monomers and viscosities of the copolymers made using the monomers are as follows:

| Mole Ratio of Allyl Glycidyl Ether Igepal CO-710 | Brookfield Viscosity (20 RPM, RVT) 0.5% Neutralized Aqueous Solution of Copolymer |
|---|---|
| 1:1.04 | 1,040 cps |
| 1:1 | 22,875 cps |
| 1:0.96 | 27,850 cps |
| 1:0.9 | 26,500 cps |
| 1:0.5 | 6,400 cps (1% solution) |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An interpolymer of monomers comprising (1) at least 60 weight percent of acrylic acid or methacrylic acid; (2) between about 0.2–20 weight percent of a glyceryl ether derivative in which one hydroxyl group is in the free form, one hydroxyl group is in the form of an allyl ether substituent, and the other hydroxyl group is in the form of an ether or ester substituent, wherein said glyceryl ether derivative is prepared by reacting allyl glycidyl ether with a monohydric alcohol or a monocarboxylic acid in the mole ratio of allyl glycidyl ether to alcohol or acid of 1:1 to 1:0.5 and wherein the monohydric alcohol is an alkyl alcohol which contains from one to 20 carbon atoms, an arylalkyl alcohol which contains from 7 to 20 carbon atoms, or an alkenyl alcohol which contains from 12 to 20 carbon atoms, or glycol or polyglycol monoethers having the formula RO(C$_2$H$_4$O)$_n$H wherein R is an alkyl group which contains from 1 to 10 carbon atoms or an aryl group which is phenyl or alkyl substituted phenyl wherein the alkyl group contains from 1 to 12 carbon atoms and wherein n has a value of 1 to about 40, and wherein the monocarboxylic acid is an alkyl monocarboxylic acid which contains from 2 to 20 carbon atoms, an aryl monocarboxylic acid which contains 7 to 20 carbon atoms, or an alkenyl monocarboxylic acid which contains from 5 to 20 carbon atoms; and (3) between about 0–20 weight percent of another olefinically unsaturated monomer copolymerizable therewith.

2. An interpolymer in accordance with claim 1 wherein the mole ratios are 1:0.95 to 1:0.8.

3. An interpolymer in accordance with claim 1 wherein the carboxylic acid groups are at least partially neutralized.

4. An interpolymer in accordance with claim 1 wherein a 0.5 weight percent solution of the said interpolymer in water has a viscosity between about 20,000–60,000 cps at a pH between about 5–9.

5. An interpolymer in accordance with claim 1 wherein the glyceryl ether monomer before polymerization substantially corresponds to the formula:

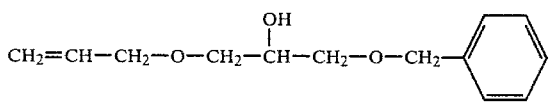

and is the reaction product of allyl glycidyl ether and benzyl alcohol.

6. An interpolymer in accordance with claim 1 wherein the glyceryl ether monomer before polymerization substantially corresponds to the formula:

$$CH_2=CH-CH_2-O-CH_2-\overset{OH}{\underset{|}{CH}}-CH_2-O-C_2H_4-O-C_4H_9$$

and in the reaction product of allyl glycidyl ether and ethylene glycol monobutyl ether.

7. An interpolymer in accordance with claim 1 wherein the glyceryl ether monomer before polymerization substantially corresponds to the formula:

$$CH_2=CH-CH_2-O-CH_2-\overset{OH}{\underset{|}{CH}}-CH_2-O-(C_2H_4O)_2-C_4H_9$$

and is the reaction product of allyl glycidyl ether and diethylene glycol monobutyl ether.

8. An interpolymer in accordance with claim 1 wherein the glyceryl ether monomer before polymerization substantially corresponds to the formula:

$$CH_2=CH-CH_2-O-CH_2-\overset{OH}{\underset{|}{CH}}-CH_2-O_2C-(CH_2)_8-CH=CH_2$$

and is the reaction product of allyl glycidyl ether and undecylenic acid.

9. An interpolymer in accordance with claim 1 wherein the said interpolymer contains acrylamide as a third monomer component.

10. An interpolymer in accordance with claim 1 wherein the said interpolymer contains N,N-dialkylacrylamide as a third monomer component.

11. An interpolymer in accordance with claim 1 wherein the said interpolymer contains alkyl (meth)acrylate as a third monomer component.

12. An interpolymer in accordance with claim 1 wherein the said interpolymer contains maleic anhydride as a third monomer component.

13. A thickened liquid composition which contains an effective quantity of a thickening agent which is an interpolymer of monomers comprising (1) at least 60 weight percent of acrylic acid or methacrylic acid; (2) between about 0.2–20 weight percent of a glyceryl ether derivative in which one hydroxyl group is in the free form, one hydroxyl group is in the form of an allyl ether substituent, and the other hydroxyl group is in the form of an ether or ester substituent wherein said glyceryl ether derivative is prepared by reacting allyl glycidyl ether with a monohydric alcohol or a monocarboxylic acid in the mole ratio of allyl glycidyl ether to alcohol or acid of 1:1 to 1:0.5 and wherein the monohydric alcohol is an alkyl alcohol which contains from one to 20 carbon atoms, an arylalkyl alcohol which contains from 7 to 20 carbon atoms, or an alkenyl alcohol which contains from 12 to 20 carbon atoms, or glycol or polyglycol monoethers having the formula RO(C$_2$H$_4$O)$_n$H wherein R is an alkyl group which contains from 1 to 10 carbon atoms or an aryl group which is phenyl or alkyl substituted phenyl wherein the alkyl group contains from 1 to 12 carbon atoms and wherein n has a value of 1 to about 40, and wherein the monocarboxylic acid is an alkyl monocarboxylic acid which contains from 2 to 20 carbon atoms, an aryl monocarboxylic acid which contains 7 to 20 carbon atoms, or an alkenyl monocarboxylic acid which contains from 5 to 20 carbon atoms; and (3) between about 0–20 weight percent of another olefinically unsaturated monomer.

14. A thickened liquid composition in accordance with claim 13 wherein the quantity of thickening agent is in the range between about 0.1–5 weight percent, based on the weight of liquid medium.

15. A thickened liquid composition in accordance with claim 13 wherein the liquid medium is a polar solvent.

16. A thickened liquid composition in accordance with claim 13 wherein the composition is an aqueous medium having a pH between about 5–9, and having a viscosity between about 20,000–60,000 cps.

17. A print paste formulation having incorporated therein a thickening agent which comprises an interpolymer in accordance with claim 1.

* * * * *